UNITED STATES PATENT OFFICE.

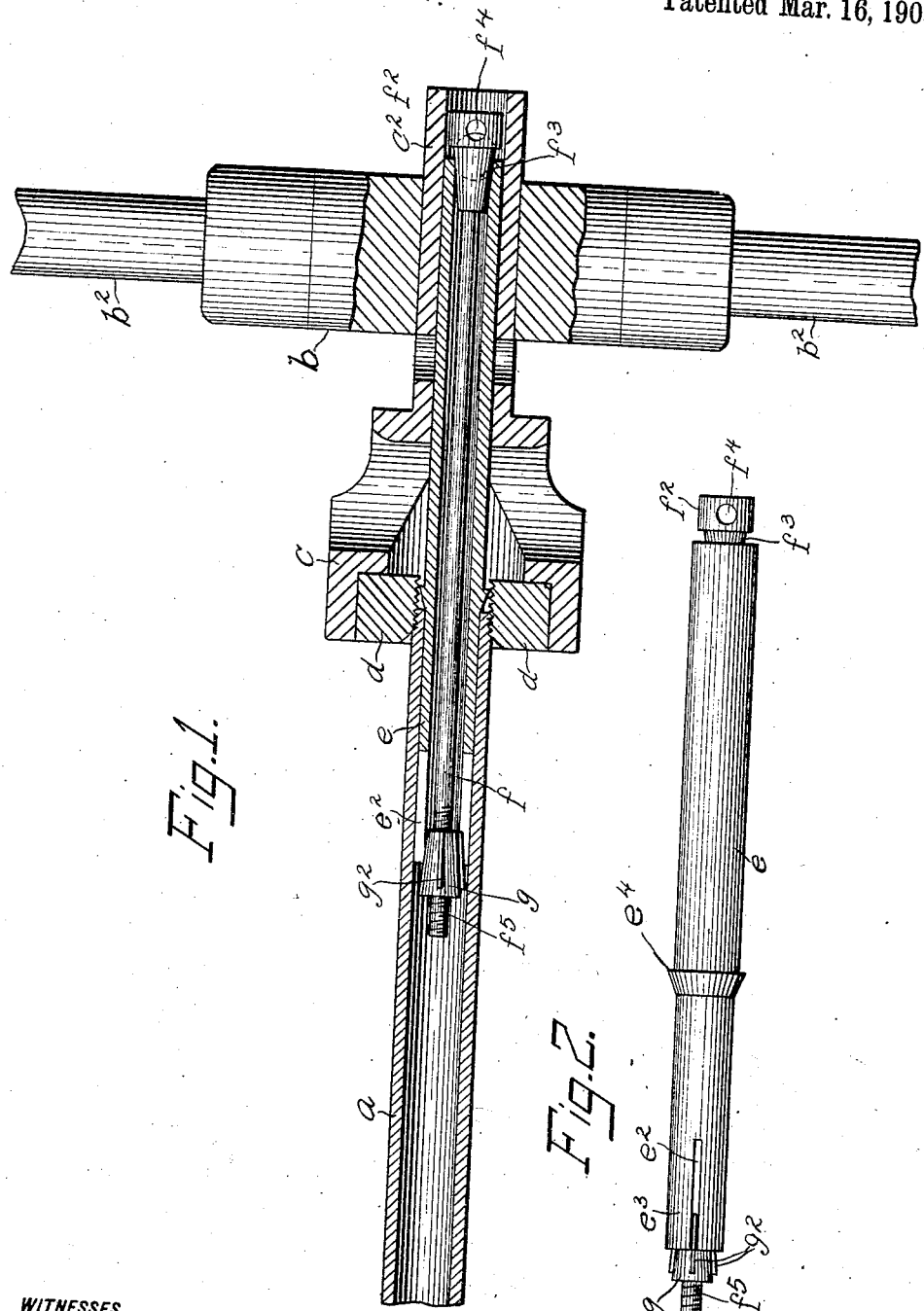

SAMUEL F. BARTOL, OF NEW YORK, N. Y.

PIPE-THREADING DEVICE.

No. 915,325.  Specification of Letters Patent.  Patented March 16, 1909.

Application filed December 10, 1906. Serial No. 347,204.

*To all whom it may concern:*

Be it known that I, SAMUEL F. BARTOL, a citizen of the United States, and residing at New York, in the county of New York and State of New York, have invented certain new and useful Improvements in Pipe-Threading Devices, of which the following is a specification, such as will enable those skilled in the art to which it appertains to make and use the same.

This invention relates to devices for use in threading pipes, and particularly for use in threading pipes secured in or protruding from a wall, ceiling or other structure, and the object thereof is to provide an improved centering device for use in connection with an ordinary pipe threader and adapted to be inserted into the pipe to be threaded so as to guide the threader and center the end of the pipe to be threaded therein.

The invention is fully disclosed in the following specification, of which the accompanying drawing forms a part, in which the separate parts of my improvement are designated by suitable reference characters in each of the views, and in which;

Figure 1 is a sectional side view showing a pipe to be threaded, my improved centering device placed therein and the method of using said centering device in connection with an ordinary pipe threader; and, Fig. 2 a side view of my improved centering device detached.

In the drawing forming part of this specification, I have shown at $a$ a pipe to be threaded, and I have also shown an ordinary pipe threader or pipe threading device, comprising a stock $b$ of the usual construction and provided with handles $b^2$, together with a die head or socket member $c$ in which the thread cutting dies $d$ are placed, formed or secured in the usual manner. The die head or die holding device $c$ is provided with an angular shank $c^2$ which passes through a corresponding opening in the stock $b$.

My improved centering device comprises a tube $e$ adapted to be inserted into the pipe to be threaded and provided at one end with longitudinal slots $e^2$ forming spring tongues or members $e^3$ and also preferably provided at a predetermined distance from said end with a tapered collar $e^4$. Passed through the tube $e$ is a rod $f$ provided at one end with a head $f^2$ having a tapered or conical member $f^3$ and provided with a transverse aperture $f^4$ through which a bolt or pin may be passed for the purpose of turning the rod $f$. The end of the rod $f$ opposite the head $f^2$ is threaded as shown at $f^5$, and mounted thereon is a conical nut $g$ provided with longitudinal ribs $g^2$ adapted to enter the slots $e^2$ in the tube $e$ so as to prevent the turning of said nut when the rod $f$ is turned.

In the use of this device, the tube $e$ with the rod $f$ therein is inserted into the pipe to be threaded as shown in Fig. 1. The rod $f$ is then turned in the nut $g$ so as to draw said nut inwardly and force the springs or spring tongues $e^3$ of the tube $e$ outwardly and into contact with the inner walls of the pipe to be threaded. This position of the parts is clearly shown in Fig. 1, and after the tube $e$ has been secured to the pipe $a$ in this manner, the threading device is brought into use. The tube $e$ is passed through the threading device which is provided with a longitudinal bore, or in other words the threading device is passed on over the tube $e$, and when the dies $d$ come in contact with the end of the pipe $a$ to be threaded the threading device is turned by means of the handles $b^2$ of the stock $b$ in the usual manner.

The tube $e$, as will be understood, centers the pipe $a$ to be threaded and forms a guide for the threading device and the threading device may be used without any previous skill or care, all that is necessary being to pass the said threading device on over the tube $e$ until it comes in contact with the end of the pipe $a$ when said threading device is turned and forced forwardly in the usual manner.

The die head or socket member $c$ is of the usual form except that the shank $c^2$ thereof is extended and provided with a longitudinal bore through which the tube $e$ passes when the threader is in use and this is one of the features of my invention and makes possible the use of the guide tube $e$ as hereinbefore described.

In the form of construction shown, the tube $e$ closely fits the pipe $a$ to be threaded, but this is not necessary as the tube $e$ may be much smaller than the pipe $a$ if desired.

Having fully described my invention, what I claim as new and desire to secure by Letters Patent, is:—

A centering device for pipe threading dies comprising a tube slotted at one end to form spring tongues, a rod passing through said tube and having a head at one end by which it may be turned and having screw threads at the opposite end, a conical nut threaded upon said rod, longitudinal ribs formed upon said nut and entering the slots of the tube, whereby the nut is held against turning with
5 relation to said tube, and a flaring stop member formed upon the outer face of the tube.

In testimony that I claim the foregoing as my invention I have signed my name in presence of the subscribing witnesses this 7th day of December, 1906.

SAMUEL F. BARTOL.

Witnesses:
  C. E. MULREANY,
  PAUL BARTELS.